(12) United States Patent
Totzke et al.

(10) Patent No.: US 10,250,660 B2
(45) Date of Patent: Apr. 2, 2019

(54) METHOD, SYSTEM AND APPARATUS FOR THE TRANSMISSION AND ADAPTION OF DATA

(71) Applicant: Unify GmbH & Co. KG, Munich (DE)

(72) Inventors: Jurgen Totzke, Poing (DE); Karl Klug, Miesbach (DE); Paul Mueller, Trippstadt (DE); Tino Fleuren, Kaiserslautern (DE); Joachim Goetze, Kaiserslautern (DE); Ralf Steinmetz, Seeheim-Jugenheim (DE); Apostolos Papageorgiou, Heidelberg (DE); Ulrich Lampe, Darmstadt (DE); Phuoc Tran-Gia, Wuerzburg (DE); Martina Zitterbart, Eggenstein (DE); Erwin Rathgeb, Velbert (DE); Adam Wolisz, Berlin (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 15/696,361

(22) Filed: Sep. 6, 2017

(65) Prior Publication Data

US 2018/0013812 A1    Jan. 11, 2018

Related U.S. Application Data

(62) Division of application No. 14/685,693, filed on Apr. 14, 2015, now Pat. No. 9,787,743.

(30) Foreign Application Priority Data

Apr. 25, 2014 (DE) .................. 10 2014 006 038

(51) Int. Cl.
 *H04L 29/06* (2006.01)
 *H04L 29/08* (2006.01)

(52) U.S. Cl.
 CPC ........ *H04L 65/602* (2013.01); *H04L 65/4069* (2013.01); *H04L 65/607* (2013.01);
 (Continued)

(58) Field of Classification Search
 CPC .... H04L 65/602; H04L 69/326; H04L 69/329
 (Continued)

(56) References Cited

U.S. PATENT DOCUMENTS 7,764,650 B2 * 7/2010 Sood ............... H04W 12/10
 370/331
8,812,835 B2 8/2014 Mugica et al.
 (Continued)

FOREIGN PATENT DOCUMENTS

CN 1623308 A 6/2005
CN 1708929 A 12/2005
 (Continued)

OTHER PUBLICATIONS

"Improved Access Point Selection"—Nicholson et al, Cheriton School of Computer Science, Univ. of Waterloo, Mar. 2006 https://cs.uwaterloo.ca/~Brecht/courses/856/readings/ap-selection/Improved-Access-Point-Selection.pdf (Year: 2006).*
 (Continued)

*Primary Examiner* — Randy A Scott
(74) *Attorney, Agent, or Firm* — Buchanan Ingersoll & Rooney PC

(57) ABSTRACT

A method for the transmission and adaption of data can include the steps of generating generic requirement documents, identifying a plurality of suitable communication patterns on the basis of the generic requirement documents, determining currently available transport options and their service quality across at least one communication network, and selecting a communication pattern from a plurality of suitable communication patterns based on the network trans-
 (Continued)

mission qualities of the at least one communication network. The method can utilize a first functional layer and a second functional layer that are integrated between a software application layer and a network access layer that each receive input documents that are independent of each other. The input documents of the second functional layer can contain transport-related information while the input documents of the first functional layer can contain application-related information. Systems and devices can be configured to facilitate use of embodiments of the method.

19 Claims, 10 Drawing Sheets

(52) U.S. Cl.
CPC ............ *H04L 65/80* (2013.01); *H04L 67/322* (2013.01); *H04L 69/326* (2013.01); *H04L 69/329* (2013.01)

(58) Field of Classification Search
USPC .......................... 709/219, 223, 224, 226, 227
See application file for complete search history.

(56) References Cited

U.S. PATENT DOCUMENTS

| | | |
|---|---|---|
| 2004/0008199 A1 | 1/2004 | Cooke |
| 2004/0081199 A1 | 4/2004 | Lopez et al. |
| 2004/0235468 A1 | 11/2004 | Luebke et al. |
| 2005/0071510 A1* | 3/2005 | Belimpasakis .... H04N 21/4126 709/250 |
| 2005/0157693 A1 | 7/2005 | Lopez et al. |
| 2006/0193295 A1 | 8/2006 | White et al. |
| 2007/0162582 A1 | 7/2007 | Belali et al. |
| 2007/0288652 A1 | 12/2007 | Carter et al. |
| 2008/0195360 A1 | 8/2008 | Chiang et al. |
| 2009/0022095 A1* | 1/2009 | Spaur .................. H04L 12/5692 370/329 |
| 2012/0221624 A1* | 8/2012 | Gerstel .................. H04L 45/02 709/203 |
| 2013/0318251 A1 | 11/2013 | Mohammad et al. |

FOREIGN PATENT DOCUMENTS

| | | |
|---|---|---|
| CN | 102668619 A | 9/2012 |
| CN | 102835166 A | 12/2012 |

OTHER PUBLICATIONS

Chinese Search Report for Chinese Patent Application No. 201510199188.1.
Siegmund, Gerd: "Technik der Netze-5., völlig neu bearbeitete und erweiterte Auflage", Heidelberg: Huthig, 2002, ISBN 3-7785-3954-X, S. 269-275.
"TCP Extensions for Multipath Operation with Multiple Address," Internet Engineering Task Force; A. Ford, C. Raiciu, M. Handley, O. Bonaventure, dated Jan. 2013; http://www.rfc-base.org/txt/rfc-6824.txt.
"The PPP Multilink Protocol (MP)," Network Working Group; K. Sklower, B. Lloyd, G. McGregor, D. Carr, T. Coradetti, dated Aug. 1996; http://www.ietf.org/rfc/rfc1990.txt.

* cited by examiner

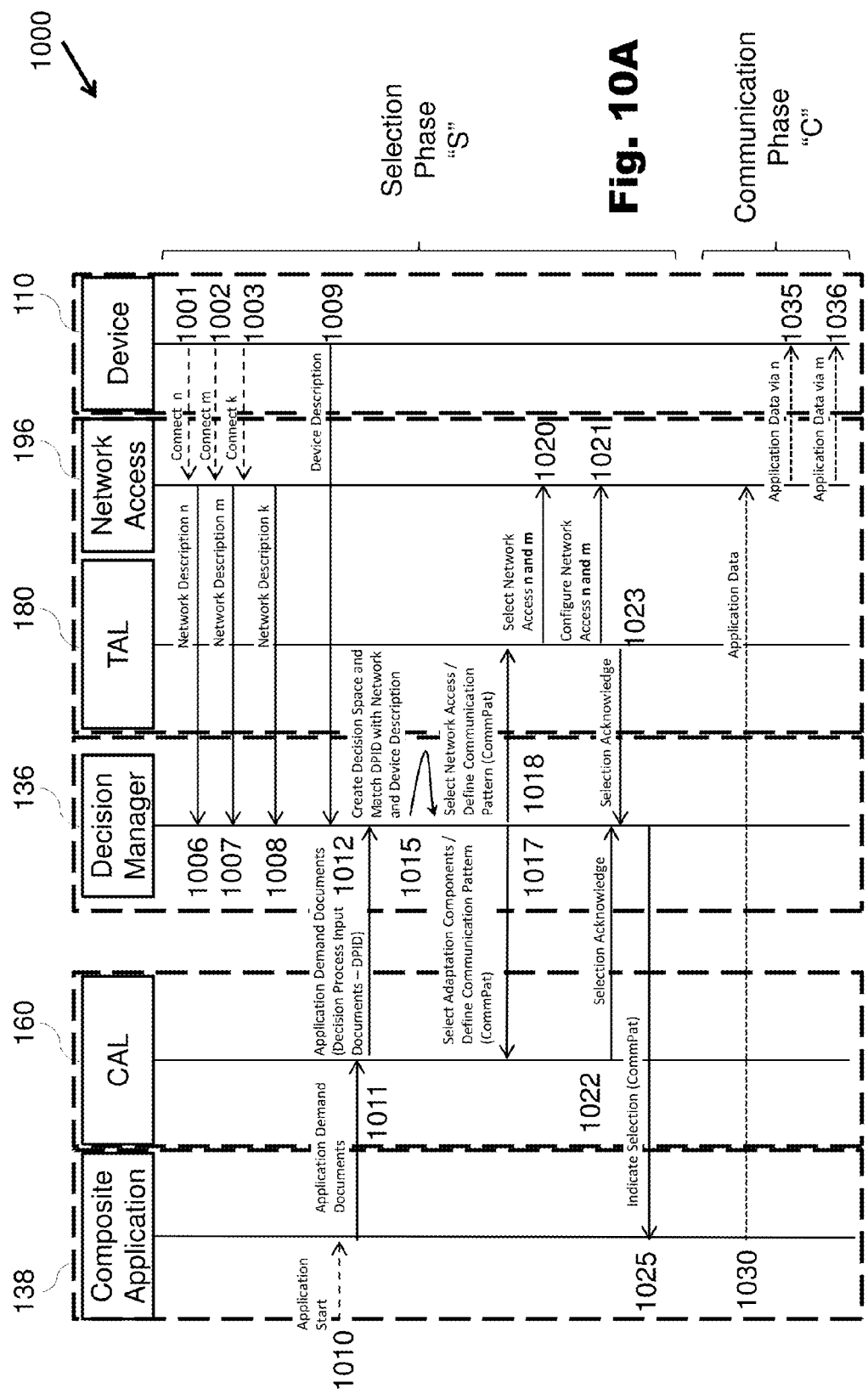

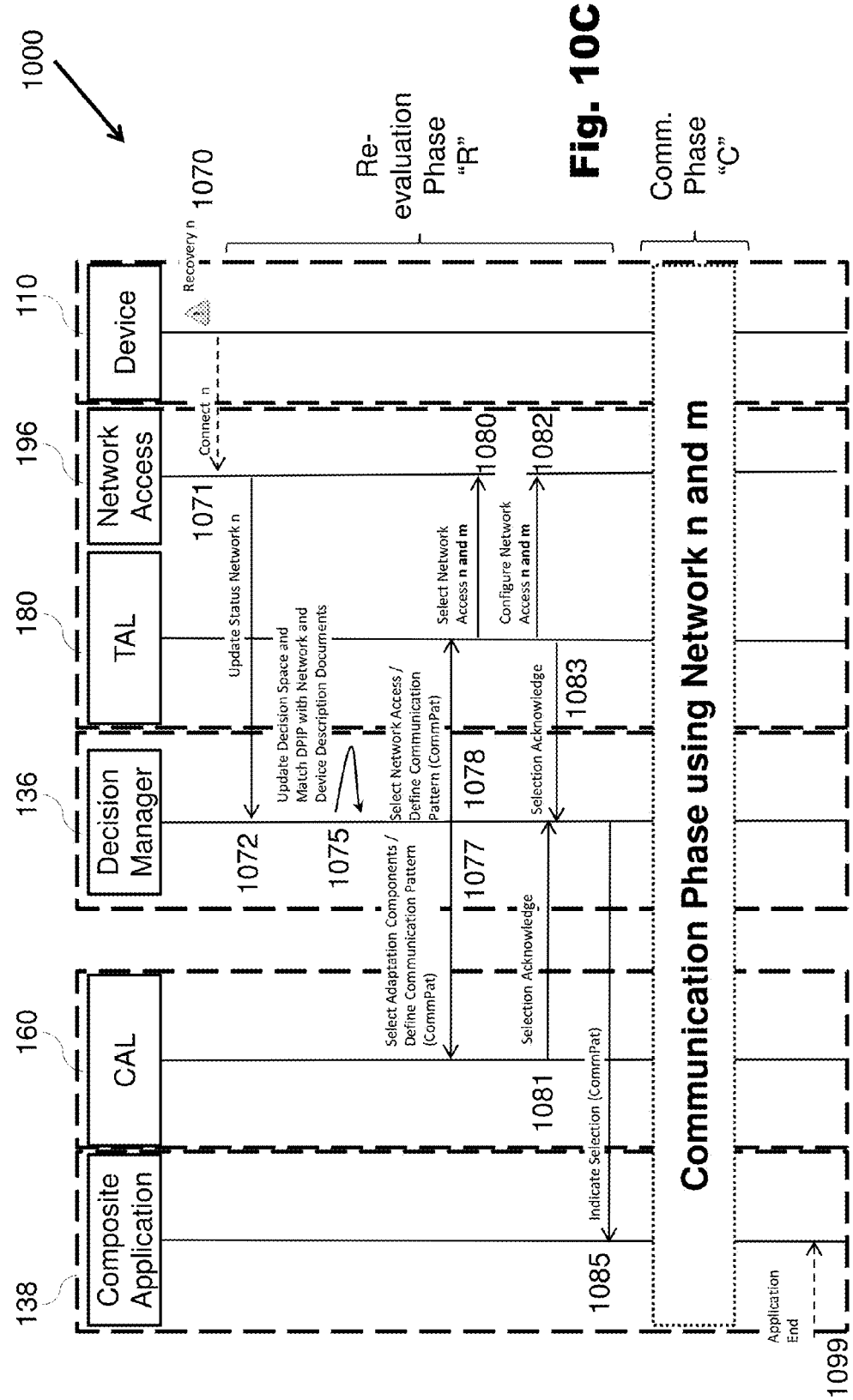

METHOD, SYSTEM AND APPARATUS FOR THE TRANSMISSION AND ADAPTION OF DATA

CROSS-REFERENCE TO RELATED APPLICATIONS

The present application is a divisional application of U.S. patent application Ser. No. 14/685,693, which claims priority to German Patent Application No. 10 2014 006 038.1.

FIELD OF THE INVENTION

The invention relates to a method, a device and a system for the transmission and adaption of data as well as a corresponding computer program, software product and digital storage medium.

BACKGROUND OF THE INVENTION

Mobile devices, mobile applications and mobile communication in general have become an ever-present part of the personal and business lifestyle in the past decade. However, many mobile applications—such as the increasingly popular "apps" on today's smartphones—typically rely on a consistent network connectivity, for example, in order to stream videos.

Despite considerable expenditures by telecommunications providers in recent years, which are reflected in high financial investments into cellular infrastructure, the coverage of mobile networks is still far from being perfect. Poor reception, complete loss of connectivity or a reduced bandwidth are known problems, for example, when traveling by train, visiting remote areas or visiting highly frequented locations such as conferences or trade fairs. Alternative networks are already available in many situations and can be utilized to maintain at least a certain functionality for mobile applications.

These days, an application must often provide its own transport capacity requirements by selecting and implementing the suitable network access points, for example by using and parametrizing a respective socket interface. In addition, each requirement that goes beyond pure transport, such as handling of a connection loss or a general adaptation of transmitted contents with regard to available network quality, must be handled individually by each application. Current research in the future internet field, which also includes this topic, is divided into two main directions that concentrate on the network level and on the application level.

On the network level, the first steps towards an adaption of transport capabilities have focused on the collection of runtime micro protocols based on an application request to improve the flexibility in transport layer protocols. Examples have been described under the subject heading "Dynamic Configuration of Protocols", DaCaPo for example in M. Vogt, T. Plagemann, B. Plattner T. Walter, "A runtime environment for da capo," in Proceedings of INET93 International Networking Conference of the Internet Society, 1993, and under the subject heading "Function Based Communication Subsystem, FCSS" for example in B. Stiller, "Fukss: Ein funktionsbasiertes Kommunikationssubsystem zur flexiblen Konfiguration von Kommunikationsprotokollen," [A function-based communication subsystem for the flexible configuration of communication protocols] GI/ITG Fachgruppe Kommunikation und Verteilte Systeme, 1994. Later, the emphasis shifted to general network functionality such as the "role-based architecture", RBA that is not based on layers or to "service integration control and optimization", SILO consisting of reusable building blocks that can be combined into a network protocol. Regarding RBA reference is made to R. Braden, T. Faber, M. Handley, "From protocol stack to protocol heap: role-based architecture," SIGCOMM Comput. Commun. Rev., vol. 33, no. 1, pp. 17-22, 2003, and regarding SILO to R. Dutta, G. Rouskas, I. Baldine, A. Bragg, D. Stevenson, "The silo architecture for services integration, control, and optimization for the future internet," in Communications, 2007. ICC '07. IEEE International Conference on Communications, June 2007, pp. 1899-1904. More recent projects work on the "Network Functional Composition" to define application-oriented protocols that utilize available network capabilities, such as "Automatic Network Architecture", ANA, "Service Oriented Network Architecture", SONATE), or "Netlet-based Node Architecture", NENA). Further information regarding these projects can be found, for example, in "Autonomic Network Architecture (ANA)", accessible online at: http://www.ana-project.org, B. Reuther, P. Müller, "Future Internet Architecture—A Service Oriented Approach" in it—Information Technology, Vol. 50, no. 6, 2008, Oldenbourg Verlag, Munich, or D. Martin, L. Völker, M. Zitterbart, "A Flexible Framework for Future Internet Design, Assessment, and Operation", Computer Networks, vol. 55, no. 4, pp. 910-918, March 2011. A more detailed description of the above projects and of some other ones has been published in C. Henke, A. Siddiqui, R. Khondoker, "Network functional composition: State of the art" in ATNAC'10: Proceedings of Australasian Telecommunication Networks and Application Conference, IEEE, 2010.

At the application level, research on the future internet is directed toward intelligent infrastructures and business processes, i.e., elevated intelligence and efficiency through tighter integration with internet networking and computer capacities. In this respect, reference is made, for example, to "Digital Agenda for Europe, Future Internet PPP" (accessible online at https://ec.europa.eu/digital-agenda/en/future-internet-public-private-partnership). This approach comprises intelligent mechanisms for content adaption with regard to the current context, for example by using an error-tolerant video codec for a conference call when the access network is prone to errors. The FI-WARE project, which is described, for example, in "Future Internet Core Platform" (accessible online at http://www.future-interneteu/home/future-internet-ppp/fi-ware.html). introduces a novel infrastructure for the cost-efficient generation and distribution of services, provision of high quality services and security guarantees in order to meet the requirements of important market stakeholders across many different segments such as health, telecommunication or environmental services.

The adaption of either network or application capabilities requires recurring awareness of requirements and conditions of the other part. Network monitoring at the application level is implemented through approaches such as RTCP feedback (e.g., via a frame loss). Based on this feedback, real-time applications such as video conferencing applications adjust the video codec used or the codec parameters. However, it is possible that such a mechanism is not sufficient to establish why the uncovered problem occurred (e.g., overload, erroneous components, etc.) and how to respond in a suitable manner. On the other hand, application signatures within the network are recognized via mechanisms of the deep packet Inspection (DPI). Although these make it possible to separate the types of applications, they cannot provide information about the application context. The existing mechanisms allow the application and network to access information about the other part but allow only for coarse responses due to the lacking knowledge about context, capabilities and exact monitoring values.

SUMMARY OF THE INVENTION

Embodiments of the present invention I may be configured to capable of overcoming the aforementioned disadvantages of the prior art at least in part. For instance, embodiments can be configured to provide improved transport network usage when one or more network connectivities are available. This problem can be particularly present when connecting mobile terminals. This problem can be solved by the features of the independent claims. Advantageous embodiments and developments of the invention can also be provided in the embodiments described by the dependent claims.

A method for the transmission and adaption of data, in particular media data, multimedia data and/or real-time communication data with the involvement of a mobile terminal, can include the steps of:
  a) generating generic requirement documents;
  b) generating a plurality of suitable communication patterns based on the generic requirement documents;
  c) determining currently available transport options and their service quality across at least one communication network;
  d) selecting a communication pattern from a plurality of suitable communication patterns based on the network transmission quality/qualities of the at least one communication network,
  wherein the method can utilize a first functional layer and a second functional layer, which are integrated between a software application layer and a network access layer, each receiving input documents that are independent of each other, wherein the input documents of the second functional layer contain transport-related information while the input documents of the first functional layer contain application-related information.

Media data may be audio data and/or video data and/or text data and/or video text data and/or conference data and/or application-specific data, etc. Multimedia data may be combined audio/video data and/or conference data and/or presentation data and/or game situation data, etc. Real-time communication data may be telephony data and/or video telephony data and/or streaming data. Generic requirement documents can be application documents that describe the requirements, ancillary conditions and demands, etc. of involved resources and instances such as applications and/or transport services and/or networks and/or devices and/or policies. The requirement documents can also be understood as decision input documents. Generating multiple suitable communication patterns can include identification among several available communication patterns and/or assembly of several partial documents (requirement documents) according to the requirements, ancillary conditions and demands, etc. that are specified in the requirement documents. Embodiments of the method can also be configured to implement optimum transport utilization dependent on at least one—among simultaneously available—currently usable network connectivity of a mobile terminal. Using the independent input documents, which on the one hand contain application-related information and on the other hand transport-related information, the first functional layer can be understood as a content-aware layer and the second functional layer as a transport-aware layer. It is to be understood that the functionalities of the first (content-aware) and the second (transport-aware) layer should be assigned separate from each other to the extent possible in some embodiments.

The step of selecting a communication pattern is performed again according to one preferred embodiment of the method, when it is determined that the available transport option and/or the service quality thereof has changed, whereby a delay time is preferably applied prior to the renewed performance of the step of selecting a communication pattern. The renewed (repeated) performance of the selection step can also achieve a data transfer flexibility in case of changed ancillary conditions. Providing a delay time can prevent system oscillation.

Another preferred embodiment of the method includes the utilization of an auxiliary component for adjusting or adapting the data and/or the contents encoded by the data and/or a data transport container in the communication pattern. The auxiliary component realizes either the adaption of the data contents or of the data transport container.

Another preferred embodiment of the method also includes device-related information with regard to the terminal involved in the input documents of the second functional layer.

Another preferred embodiment of the method includes also information about external policies in the input documents of the first functional layer. External policies may include but are not limited to real costs or virtual costs of the transport, for example. Integrating such policies can also foster fairness among the users of the transport network.

Another preferred embodiment of the method provides that the generic requirement documents form a decision space from which transport resources that are suitable or best suited or specified by policies are selected continuously through the first functional layer and are derived from the current network access conditions via the second functional layer and are passed on to the first functional layer.

According to another aspect of the invention, a device for the execution of the method described above can include hardware. The hardware of the device can include, for example, at least one processor connected to at least one transceiver unit and non-transitory memory. For instance, the device can be configured as a server computer device (e.g. a media download server or a conference server), a mobile terminal (e.g. a smart phone, a laptop computer, etc.) and/or a conferencing unit.

Another aspect of the invention concerns a computer program comprising program commands that cause a computer to execute the process steps of the method described above, when the computer program is installed in or runs on the computer.

Another aspect of the invention concerns a software product that is stored on a non-transitory computer-readable medium and can preferably be installed directly into the internal memory of a computer and has program codes for carrying out the method described above when the computer program is executed on the computer.

Another aspect of the invention concerns a non-transitory digital storage medium with electrically readable control signals that can work with a programmable computer in order to manage communication activities, wherein the control signals are designed and adapted to cause the computer to execute the process steps of the method described above.

Embodiments can be configured to provide an automatic control mechanism for at least one layer based on the actual network conditions, e.g., network availability and network properties of the available connectivities. Embodiments of the invention can be configured as a method for transmitting and adapting data, a device for carrying out the method, a computer program comprising program commands that cause a computer to carry out the method sequences of the described method defined by code of the computer program when the computer program is installed on the computer or is carried out by it, by a software product that is stored on a medium readable by an electronic device and can preferably be installed directly into the internal memory of the device and that has program codes for carrying out the method sequences of the described method when the computer program runs on the device, and/or by a digital storage medium having electrically readable control signals that can operate with a programmable communication device in order to manage communication processes, whereby the control signals are designed and adapted to cause the communication device to carry out the process steps of the described method.

Additional features, tasks, advantages and details of the present invention will become more apparent from the following description of concrete exemplary embodiments and their presentation in drawings in the included figures. It is understood that features, tasks, advantages and details of individual exemplary embodiments are transferrable to other exemplary embodiments and are considered to be disclosed also in connection with the other exemplary embodiments unless this is obviously inapplicable for technical or physical reasons. Accordingly, features of various exemplary embodiments can fundamentally be combined with other exemplary embodiments and the combination can also be considered an exemplary embodiment of the invention.

BRIEF DESCRIPTION OF THE DRAWINGS

The invention is described below in more detail based on preferred exemplary embodiments and with reference to the figures. It should be appreciated that like reference numbers used in the drawings may identify like components.

The figures are schematic presentations and not necessarily according to scale. The illustrations in drawings and the descriptions thereof shall be considered exemplary illustrations of the principle of the invention and shall in no way restrict the invention. The figures are:

FIGS. 10A to 10C are successive sections of a sequence diagram for illustrating the inventive method according to one embodiment of the present invention where:

FIG. 10A illustrates a sequence diagram illustrating a first set of steps of an exemplary embodiment of the method;

FIG. 10B illustrates a sequence diagram illustrating a second set of steps of the exemplary embodiment of the method; and FIG. 10C illustrates a sequence diagram illustrating a third set of steps of the exemplary embodiment of the method.

DETAILED DESCRIPTION OF EXEMPLARY EMBODIMENTS

Figure 1:
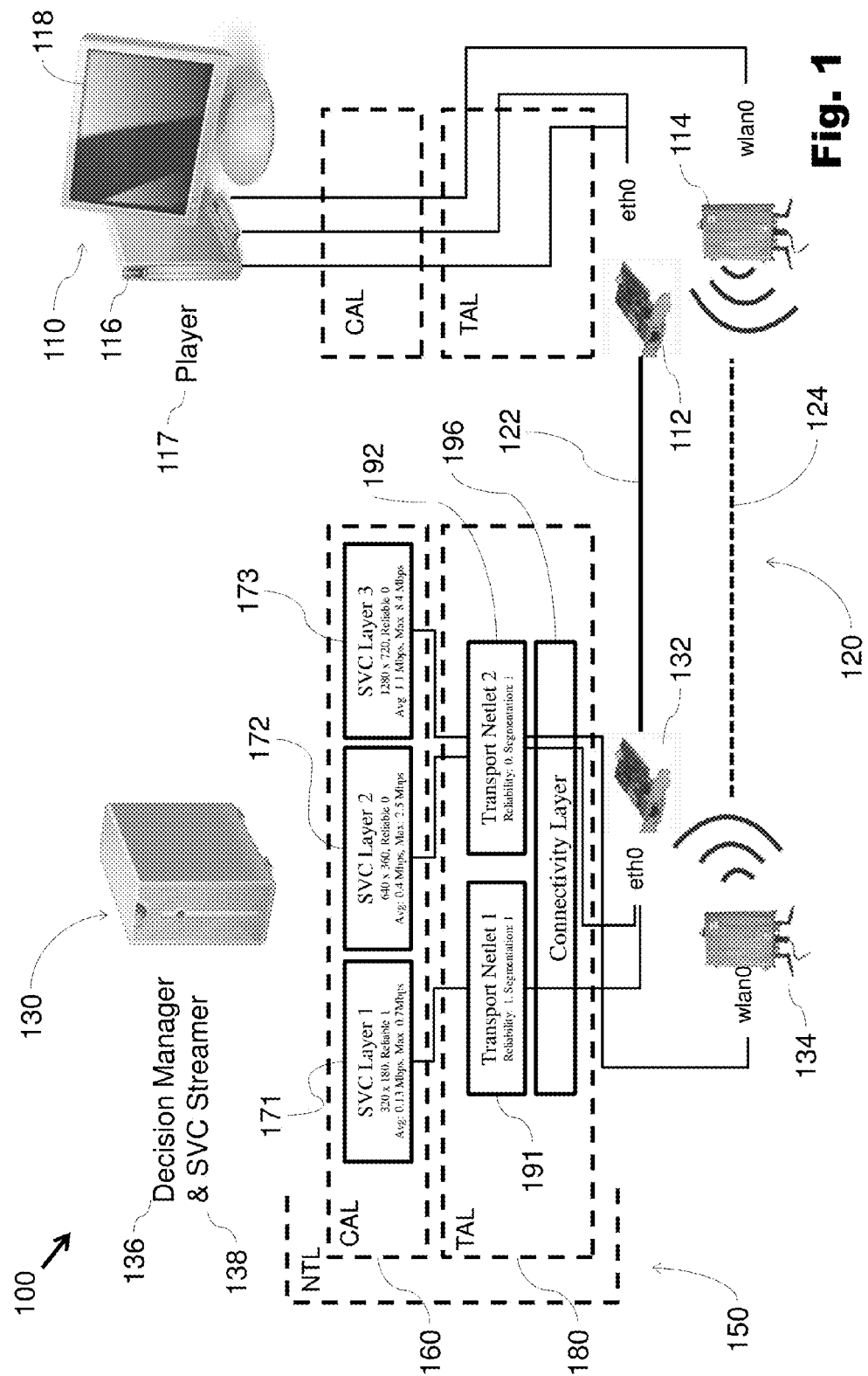
FIG. 1 is a schematic block diagram of a system according to the present invention.

FIG. 1 shows a schematic block diagram of a system, in particular a communication system 100 according to one embodiment of the present invention.

In the communication system 100, a terminal 110 is connected to a server 130 via a network environment 120. In particular, terminal 110 has a network card 112 as well as a radio interface (not shown in detail) that has established a radio connection using a wireless local area network (WLAN) connection point 114 at the terminal. On the other hand, server 130 has a network card 132 as well as a radio interface (not shown in detail) that has established a radio connection using a WLAN connection point 134 at the server side. The network environment 120 has a wired network such as Ethernet (eth0) 122 and a radio network such as WLAN (wlan0) 124. However, the invention is not restricted to the shown network cards and protocols.

Terminal 110 is associated with a user (not shown in detail) and is able to reproduce multimedia contents. Terminal 110 in the shown example has a computer unit 116 having a reproduction application (player) 117 and is connected to a screen 118. In this example, the computer unit 116 is configured as a compact workstation, however, the invention is not restricted to this. The computer unit 116 can also be configured as a laptop computer, tablet computer, smartphone, game console, as part of a HIFI system or in any other suited manner. In particular, the computer unit 116 can have an integrated screen such that it does not need to rely on the external screen 118 for reproducing media data. The reproduction application 117 can be designated as a functional unit or a functional instance.

The server 130 is located at a distance from terminal 110 and has among other things a decision manager 136 and a scalable video codec (SVC) streamer application 138 that each can be implemented through software and/or hardware. The decision manager 136 and the application 138 can also be designated as functional units or a functional instances either each by itself or in cooperation. The SVC streamer 138 is an example for a multimedia application and will be designated short as application 138 (also "composite application" in FIGS. 2, 4, 10A to 10C).

The terminal 110 is thus connected to the server 130, serving as a video source, via multiple network access points. The server 130 distributes all layers of a SVC. Additionally measured are the availability of the network access and its current individual transport capacity, reliability and quality. This information is distributed towards a functional unit, wherein in the present example of video streaming, for example, the obtained user experience is assessed, for example via the E model according to ITU-T Recommendation G.107 under approximation of an expected mean opinion score (MOS).

For data transmission, use is made of a network tolerant layer, NTL 150. The NTL 150 is integrated between a software application layer and a network access layer and has two interacting sublayers 160, 180 (cf. also FIG. 2), which are here also designated as functional layers, an object model with adaptive bindings (cf. also FIG. 3) and a control instance.

According to the presentation in FIG. 1, a content-aware layer CAL 160 is provided as an upper sublayer of the NTL 150 and a transport-aware layer TAL 180 as the lower sublayer of the NL 150. The TAL 180 is provided to carry transport capabilities via heterogeneous networks, while the CAL 160 is provided to adapt the transmitted data contents according to the context of mobile devices. TAL 180 and CAL 160 can also be understood as functional units.

According to the presentation in FIG. 1, three layers of a scalable video codec (SVC) are available at the level of the CAL 160, namely a first SVC layer 171, a second SVC layer 172 and a third SVC layer 173, which can be used selectively or additively. According to the information in FIG. 1, the SVC layers 171, 172, 173 differ from each in their image resolution, their reliability (reliable) and their mean (avg) and maximum (max) transmission rate. Two transport netlets 191, 192, which can be used selectively or additively and a connectivity layer 196 are available at the TAL 180 level. The transport netlets 191, 192 differ from each other by their degree of reliability and possibly also their segmentation value. The connectivity layer 196 controls a network access by establishing a connection with both the server-side network card 132 and—via the radio interface (not shown in detail)—the server-side WLAN connection point 134. The connectivity layer 196 is linked upwards with the two transport netlets 191, 192. The first transport netlet 191, having a high degree of reliability (1), is connected beyond the sublayer boundaries to the first SVC layer 171, which also has a high reliability (1), and via the connectivity layer 196 to the network card 132 of server 130. The second transport netlet 192, having a low degree of reliability (0) is connected beyond the sublayer boundaries to the second SVC layer 172 and the third SVC layer 173, which also have a low degree of reliability (0), and via the connectivity layer 196 to both the network card 132 of the server 130 and the server-side WLAN unit 134. In some embodiments, the first transport netlet 191, having or demanding a high degree of reliability, may not be connected via the WLAN network wlan0.

On the transmitter side (Server 130), the CAL 160 receives the encoded layered multidescriptive data stream from application 138. CAL 160 has exact technical information of the SVC streamer application 138 and of the used codecs and of the influence that the individual layers/descriptions have on the quality as perceived by the user. CAL 160 identifies and separates the different layers/descriptions by examining the encoded stream. Via one of the respective SVC layers 171, 172, 173, the separated streams or aggregates are transferred to TAL 180 piece by piece together with meta information that describes the importance of and the requirements for the transferred data. TAL 180 is thus capable of dynamically adapting the number of transmitted layers/descriptions based on the available network access points 132, 134 and the total available bandwidth. Furthermore, the distribution of layers/descriptions of high importance can be ensured by using additional protective mechanisms such as re-transmission or forward error correction. Additional mechanisms are provided based on the separation of layers/descriptions of the application data in order to allow for synchronization of the data streams on the receiver side to pass on a valid data stream to the application. This is achieved, for example, by adding an additional sequence number before every piece to the stream to the TAL 180.

An additional buffer is provided on the receiver side (terminal 110) to allow for synchronization of the separated data streams and passing on of a valid application layer data stream. This can be the same data stream provided by the transmitting application 138 but can also be a stream in which parts of layers or entire layers are missing, either due to network overload or due to decisions in the TAL 180. The presented approach also uses a new sequencing buffer that re-sorts the data stream based on the sequence numbers of the data pieces. Since this buffer introduces an additional delay, it is dimensioned with regard to application and network parameters.

A more general perspective of the procedures of the method according to the invention, its underlying functionality and how the sublayers of the NTL 150 interact under control of the decision manager (DM) 136 will now be explained based on the presentation in FIGS. 2 to 5. In this case, the decision manager 136 is to be understood as a software component with the NTL 150 for controlling the involved sub-layers (functional layers) CAL 160 and TAL 180.

Figure 2:
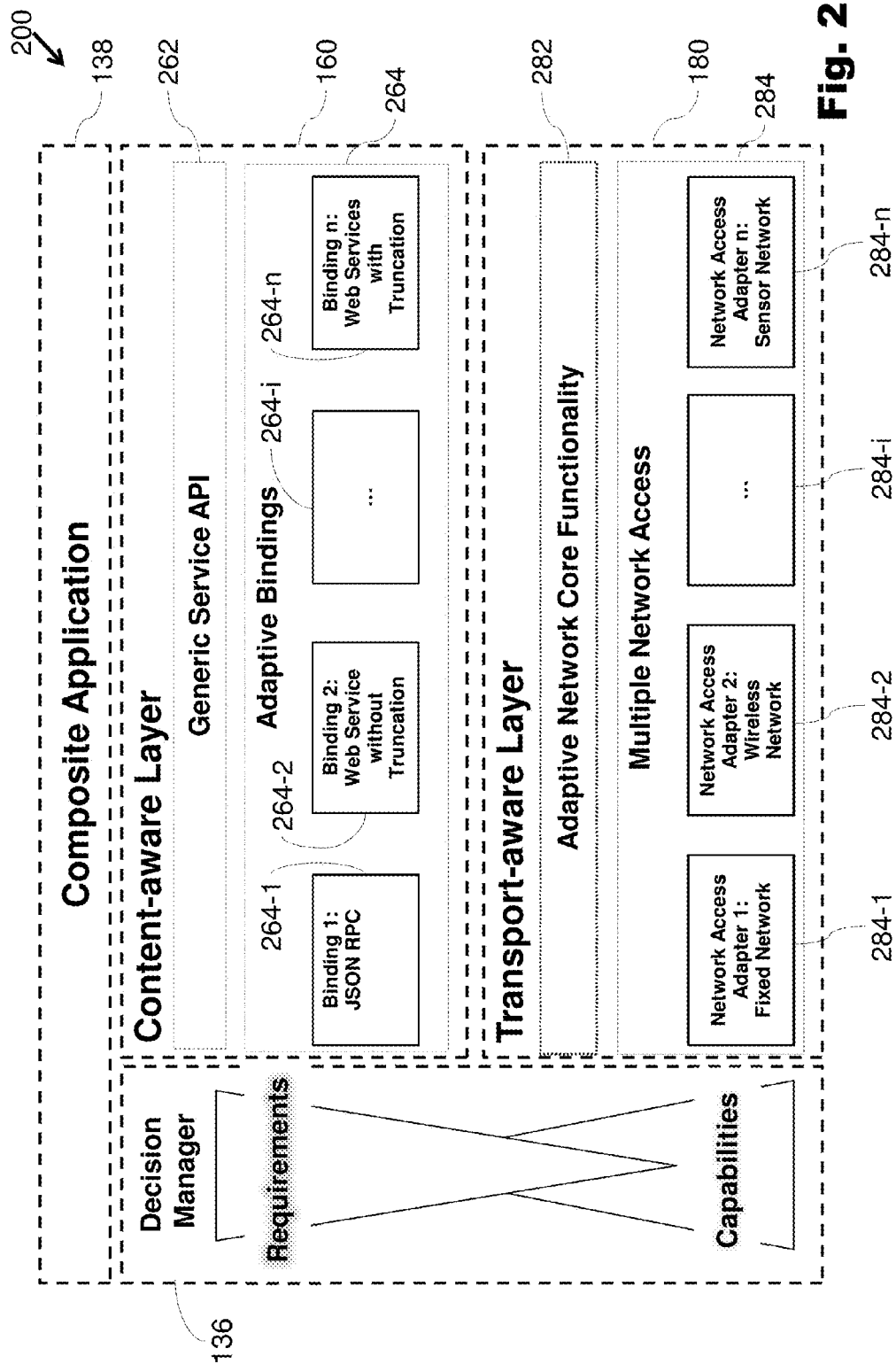
FIG. 2 is a schematic presentation of a layer structure with a network-tolerant layer according to the present invention.

FIG. 2 shows a layer structure 200 with the NTL 150 of the embodiment shown in FIG. 1. The applications (here designated as "composite application", for example the application 138 of FIG. 1) use a generic application program interface (API) 262 assigned to CAL 160, and transport their capability options and requirements regarding transport capability using a set or a group of adaptive binding artifacts 264 (264-1 to 264-n) with preferences. The adaptive binding artifacts 264 are software components that are designed to select and carry out a mechanism for contents adaption for the runtime. Because they are processed by the decision manager 136, these artifacts 264 are designated as decision process input documents (DPID) according to the present invention. According to one embodiment of the invention (not shown) the auxiliary component is integrated into the adaptive bindings 264. The layer structure 200 shown in FIG. 2 is also called "Sillberg" architecture. The network access layer is located outside the "Sillberg" architecture, underneath the decision manager 136 and the transport-aware layer TAL 180. The network access layer is not shown in FIG. 2, because the individual network access points are represented by the network access adapters 284-1 to 284-n of the multiple network access 284. The transport-aware layer TAL 180 includes an adaptive network core functionality 282 in addition to the multiple network access 284. By using the multiple network access 284, the adaptive network core functionality 282 maintains the core functionalities of the network with regard to the transport of data such as speech, video, text, etc. The adaptive network core functionality component of the TAL manages the current transport capabilities via the existing network access points and passes the adapted transport property documents as DPID of the TAL to the decision space when the connection is established or altered and thus triggers the decision process of the decision manager from the perspective of the TAL. The connectivity layer 196 shown in FIG. 1 corresponds to the multiple network access of the Sillberg architecture and differs from the (not shown) network access layer.

Figure 3:
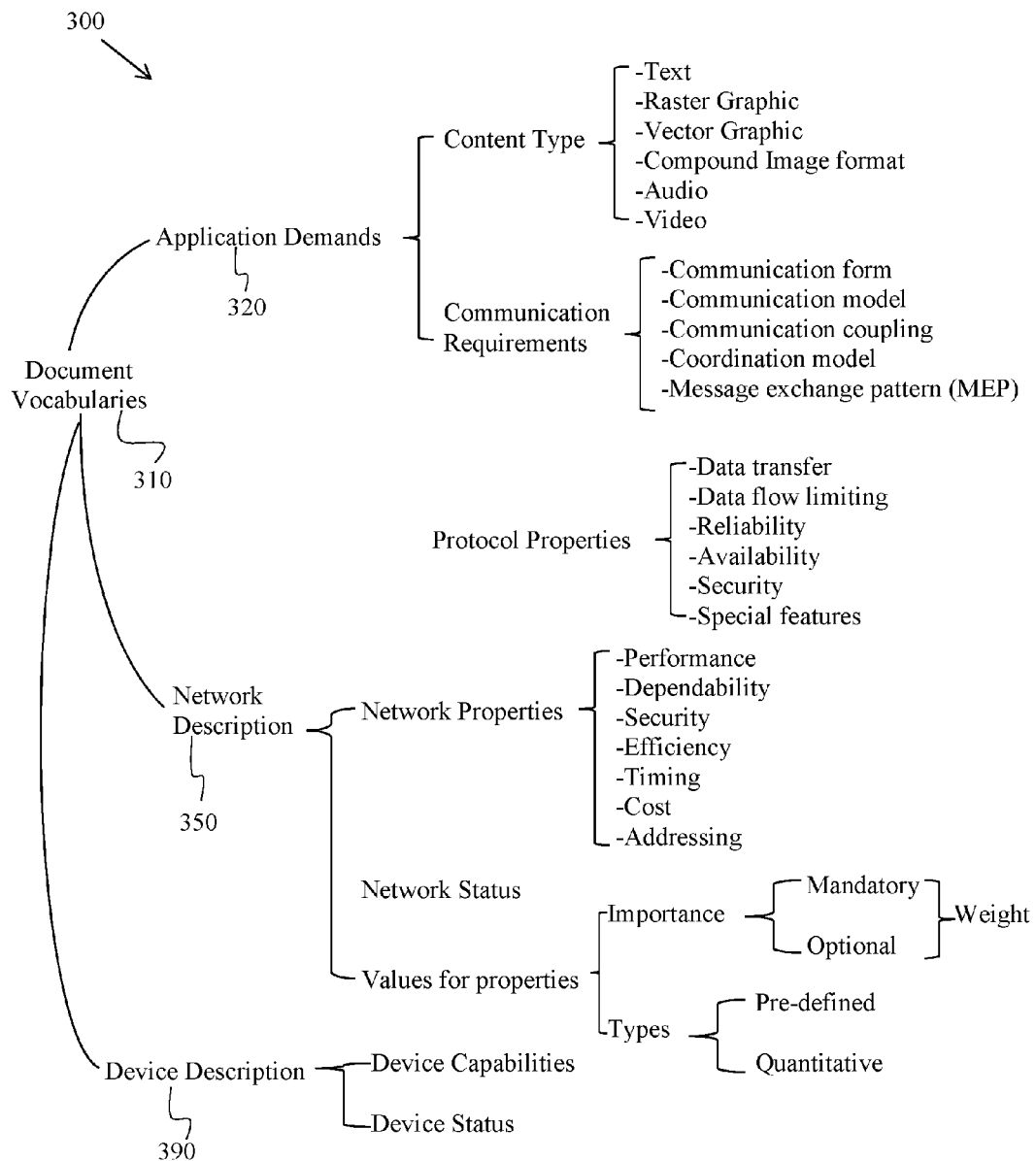
FIG. 3 is an object model of the network-tolerant layer.

FIG. 3 shows an object model 300 of the NTL 150 with document vocabularies 310 in the Sillberg architecture 310 described above. According to the presentation in FIG. 3, the document vocabularies comprise application requirements 320, network descriptions 350 and instrument descriptions 390. The document vocabularies describe the requirements from the perspective of the applications as well as the properties from the perspective of the network access and the device properties, which in their respective characteristic (DPIDs, decision process input documents) are among other things the basis for the decision in the layer structure 200 described above. The DPIDs are the generic requirement documents of the application and those of the transport property documents as well as the device property documents. All together, the DPIDs form the decision space from which the decision manager performs the best possible adjustment between requirement and transport capability with optional use of policies.

Figure 4:
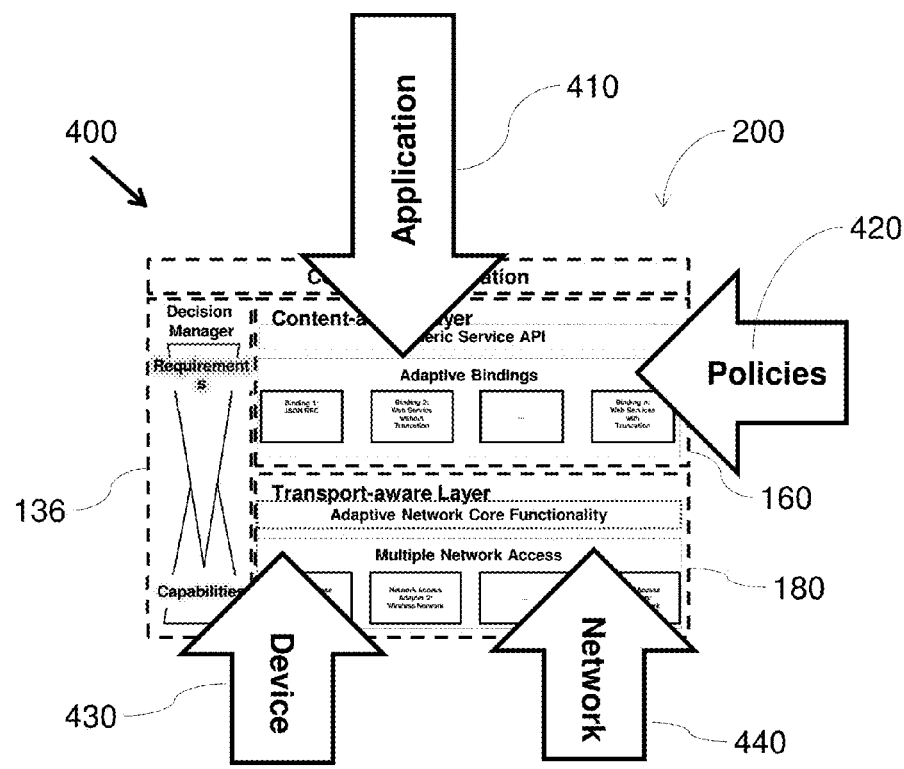
FIG. 4 is a schematic presentation of various categories influencing the decision process in the layer structure of FIG. 2.

FIG. 4 shows the influencing scheme 400 of influencing factors or influencing categories on the decision process in the layer structure 200 described above. According to the presentation in FIG. 4, the decision process of the decision manager 136 is influenced by application requirements and polices of which the CAL 160 is aware, and by device and network parameters (capabilities and conditions), of which the TAL 180 is aware. These influences are designated as application documents 410, policy documents 420, network documents 430 and device documents 440 and form the input documents (DPID) for the decision process by the decision manager 136. It is assumed that the CAL 160 does not describe network mechanisms but rather a behavior.

The following Table 1 illustrates a set of known adaption mechanisms with regard to message/stream encoding without changing the content depending on aspects that are specified inside the DPIDs. These aspects comprise application demand documents with regard to content type and communication requirements, network status, importance indications and device descriptions with regard to capability and status. The latter are preferably taken from the World Wide Web Consortium Composite Capabilities Preferences Profile (W3C CC/PP) or exemplary specifications of the Open Mobile Alliance (OMA), e.g., for Wireless Application Protocol (WAP) capable devices.

In Table 1, the expected response time improvement is compared to Simple Object Access Protocol (SOAP), Hypertext Transfer Protocol (HTTP), or Transmission Control Protocol (TCP) using various approaches for several components with regard to some aspects and are all together combined. The aspects of service call dependence and service call frequency are viewed for the components of the application. The aspects of the processing time, the SOAP message size and the data size/SOAP size are viewed for the components of the service. The aspects of CPU power are viewed for the component of the terminal (device). The aspects of stability, packet loss, latency and of the bandwidth are viewed for the component of the terminal network connection. The comparison is done with regard to the approaches SOAP over User Datagram Protocol (UDP), SOAP over Stream Control Transmission Protocol (SCTP), zLib compression, SOAP over wireless access protocol (WAP), SOAP over TCP with fixed connection, SOAP over (Simple Mail Transfer Protocol) or Post Office Protocol version 3 (POP3), wireless SOAP, JAVA RMI, Handheld Flexible Representation (HHFR), MundoCore RMC and fast web services. It should be noted that comparison values are not available for all approaches for the respective components or aspects, respectively.

TABLE 1

| | Component | | | | |
|---|---|---|---|---|---|
| | Network connection properties of the device | Inst. Prop. | Service properties | | Application properties |
| | Aspect | | | | |
| Approach | Bandwidth | Delay | Pkt loss | Stb | CPU speed | Data size/ SOAP size | SOAP msg length | Pr. t. | Srv. Req. Freq. | Srv. Reg Dep | Expected improvement in response time compared to SOAP/HTTP/TCP |
|---|---|---|---|---|---|---|---|---|---|---|---|
| SOAP-over-UDP | | ≥m | ≤s | | | | ≤m | ≤s | | ≤s | 8-10x |
| SOAP-over-SCTP | | ≥m | ≥h | | | | | | | ≥h | 1.1x-1.3x |
| zLib Compression | ≤s | | | | | ≥m | ≥m | | | | 1x-1.5x |
| SOAP-over-WAP | ≤m | | | | | | | | | | 1.3x |
| SOAP-over-TCP with persistent connection | ≥m | | | | ≥h | | ≥m | | | ≥h | 2x-5x |
| SOAP-over-SMTP/POP3 | | | | ≤m | | | | ≥h | | | — |
| Wireless SOAP | ≤m | | | | | ≤s | ≥m | | | | 3x-5x |
| JAVA RMI | ≥m | ≥m | ≤s | | | | | | | | >10x |
| HHFR | ≤m | | | | | ≤m | | | ≥m | | 1.5x-10x |
| MundoCore RMC | | | | | ≤m | | | | | | 3x-5x |

TABLE 1-continued

| | Component | | | | | | | | | | |
|---|---|---|---|---|---|---|---|---|---|---|---|
| | Network connection properties of the device | | | Inst. Prop. | | Service properties | | | Application properties | | |
| | Aspect | | | | | | | | | | |
| Approach | Bandwidth | Delay | Pkt loss | Stb | CPU speed | Data size/ SOAP size | SOAP msg length | Pr. t. | Srv. Req. Freq. | Srv. Reg Dep | Expected improvement in response time compared to SOAP/HTTP/ TCP |
| Fast Web Services | ≤m | | | | | ≤m | ≥m | | | | 2x-10x |

Adaptation without contents, where
"Inst. Prop." refers to instrument properties,
"Pkt loss" refers to packet loss,
"Stb" refers to Stability,
"SOAP msg. length" refer to SOP message length,
"Pr. t" refers to Processing time,
"Srv. Req. Freq." refers to service request frequency, and
"Srv. Req. Dep." refers to service request dependencies.

Figure 5:
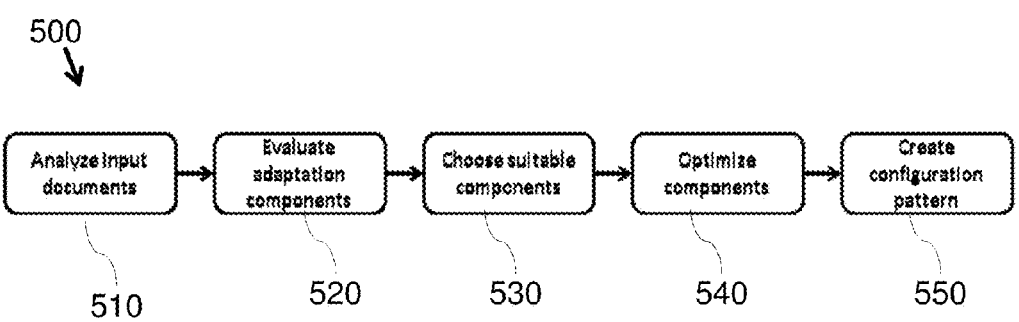
FIG. 5 is a schematic diagram of a set of generic DPIDs (Decision Process Input Documents) that are generated according to the present invention.

Introduced in FIG. 5 is a set or a group of generic DPIDs 264 optionally with alternatives through application 138, which is formed according to the present invention and is processed by the decision manager 136, in the form of a process sequence 500 as follows: Analyze entered DPIDs (step 510), evaluate (step 520), select, configure and link adaption components (step 530), optimize the components (step 540) and create a so-called decision space that consists of a set of communication patterns (step 550). The communication patterns include also prescribed safety schemes.

The TAL 180 (more accurately: the software components in the TAL 180) generate a set of transport network capabilities documents on the basis of the provided available network connectivity and measured quality of service of the network. According to the present invention, the transport can be provided by one single network access point or one single network access technology or with the use of a transport network superimposition or overlay that covers one or more network access and transport protocols simultaneously, i.e., through effective use of existing technologies such as SpOVnet:Ariba or NENA that allow for a flexible, complementary transport protocol provision.

As part of the TAL 180, the adaptive network core functionality automatically provides a set of transport capabilities with quality measures on the basis of the current connectivity. The decision manager 136 compares the stated transport capabilities and safety features with the communication patterns according to their precedence and selects the best fitting configuration, e.g., TLS, TCP, UDP, SCTP over UDP, Internet Protocol Security (IPSec), etc.

When the network condition changes due to changed network access points or network interferences then the decision manager 136 repeats the decision process by adapting the identified communication pattern to the current transport capabilities. This can include the involvement of adaption mechanisms on the CAL, which are then transparent for the application itself. The response time on a lost network connectivity is more critical compared to network interference. Another trigger could be a started or stopped application that competes with network access and requires balancing and/or traffic prioritization. To prevent oscillation of the system, a minimum non-evaluation time or tolerance time must be defined additionally.

An example of how the input documents and the communication pattern can look will now be described based on FIGS. 6 to 9. This example does not claim completeness; however, it is helpful to understand the meaning and the strategic value of all involved documents and the result of the decision process.

In the basic scenario (cf. also FIG. 1), a user carries out an NTL-based video streaming application 117 on his mobile device. The application supports both video and audio or a still image with audio only. This depends on the available networks and their currently available capabilities such as bandwidth. Two networks are available for selection by the decision manager at the time the decision process is triggered.

Figure 6:
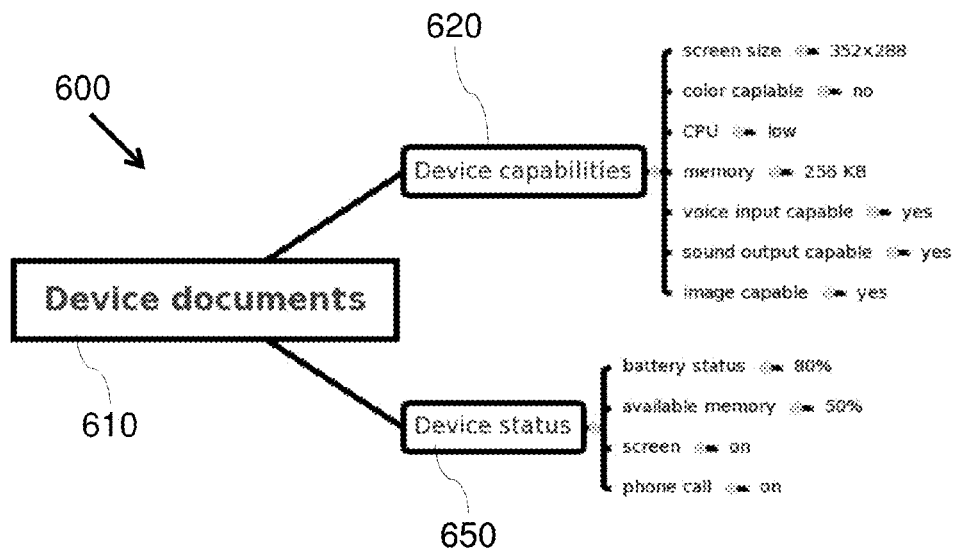
FIG. 6 is a schematic diagram of data structures of device documents, a requirement set, of network configurations or of a selected partial set of DPIDs that are used according to the present invention.

FIG. 6 shows a data structure 600 having a set of device documents. A first device document 610 describes device capabilities such as screen size, CPU efficiency, total memory, etc., and a second device document describes the device status such as battery status, available memory and whether a phone call is in process. A phone call would have priority over other applications because it uses a substantial amount of the device's resources and is the predominant application of the device. The device documents 620, 650 are examples of the device document 430 in FIG. 4.

The application provides the application documents that describe their requirements and demands. In this example, the application supports three alternative application sets: Minimum, good and satisfactory. For the application to be operational, the requirements of the requirement set "minimum" must be observed, i.e., the requirement set "minimum" is mandatory. In this case, the application uses only one audio stream with a still image. The two other requirement sets "good" and "satisfactory" are optional.

Figure 7:
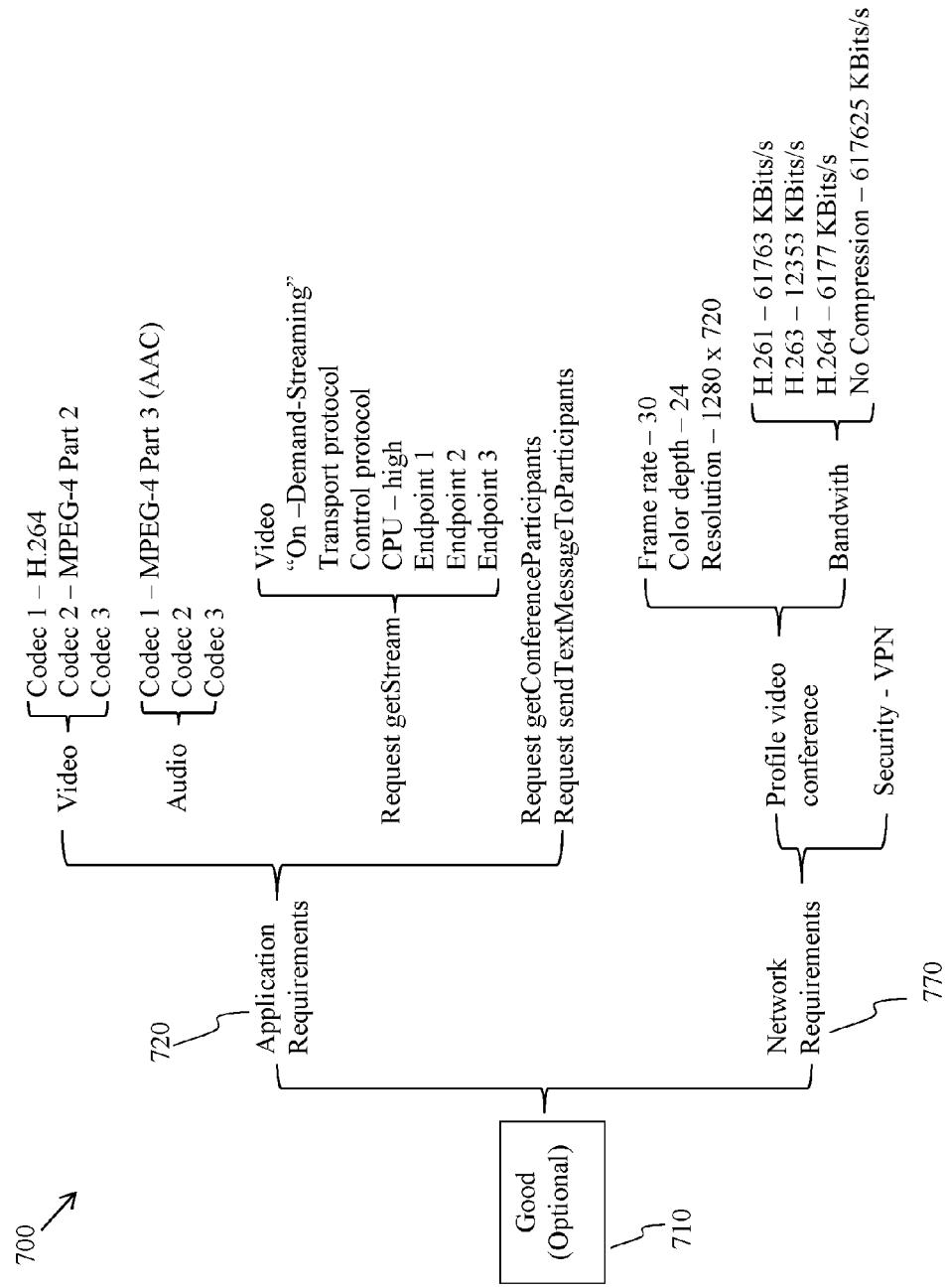
FIG. 7 is a schematic diagram of data structures of device documents, a requirement set, of network configurations or of a selected partial set of DPIDs that are used according to the present invention.

FIG. 7 shows a data structure 700 having in particular the favored requirement set "good (optional)" 710. In this case, the application supports the content types "audio" and "video" with several codecs in an application requirement document 720. When the application requests a video distribution data stream, the stream uses "Request getStream", which has multiple client-endpoints assigned. The application selects, for example, a predefined profile with the name "video conference", which describes a certain set of requirements for a video conference configuration that supports the application in a network requirements document 770. The requirements set "satisfactory" is defined in the same manner. The application requirements 720 and the network requirements 770 are examples of the application document 410 in FIG. 4.

At this time, two networks are available: "WLAN" and "GSM-GPRS-CS4-8 time slots". The capabilities of these networks are described in predefined documents. In order to fulfill the requirements of the application, predefined protocol stacks are described, from which the decision manager can make a selection.

Figure 8:
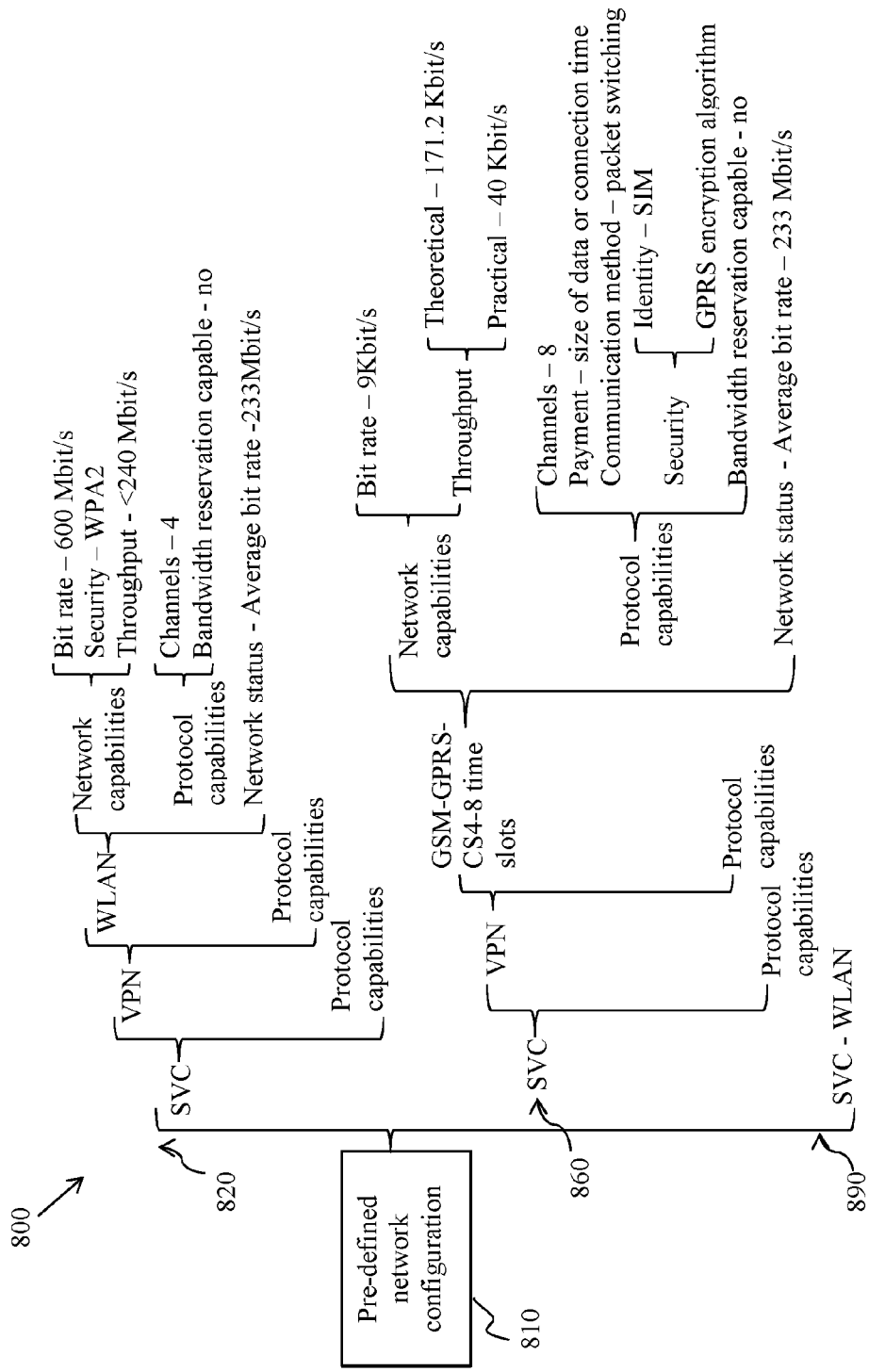
FIG. 8 is a schematic diagram of data structures of device documents, a requirement set, of network configurations or of a selected partial set of DPIDs that are used according to the present invention.

FIG. 8 shows a data structure 800 having a set of network configurations 810. The set of network configurations 810 has three network configurations or protocol stacks 820, 860, 890 that are possible at the current time.

820 designates a network configuration SVC over VPN over WLAN.

860 designates a network configuration SVC over VPN over GSM-GPRS-CS4-8 time slots.

890 describes a network configuration SVC over WLAN.

Documents describing the features and capabilities will exist for each of the combinations 820, 860, 890 of protocol and network. In addition, the NTL 150 will provide documents describing the current status of these networks; for example, the average bit rate of the WLAN connection that has just been measured is 233 Mbits/s (cf. FIG. 8, branch: SVC/VPN/WLAN/Network Status/average bit rate). All these documents are examples for the network document 440 in FIG. 4

The decision manager 136 will have to determine, which of these combinations 820, 860, 890 is best suited to meet the requirements. For example, the last combination 890 "SVC over WLAN" violates the requirement "Security VPN" as demanded by the application and the decision manager will, therefore, not select this combination.

In addition, the capabilities are being or will be specified for each protocol or network but the decision manager 136 will have to evaluate also the combined values. For example, the theoretical bandwidth of WLAN is given but in combination with VPN, the actual bandwidth will be lower.

Figure 9:
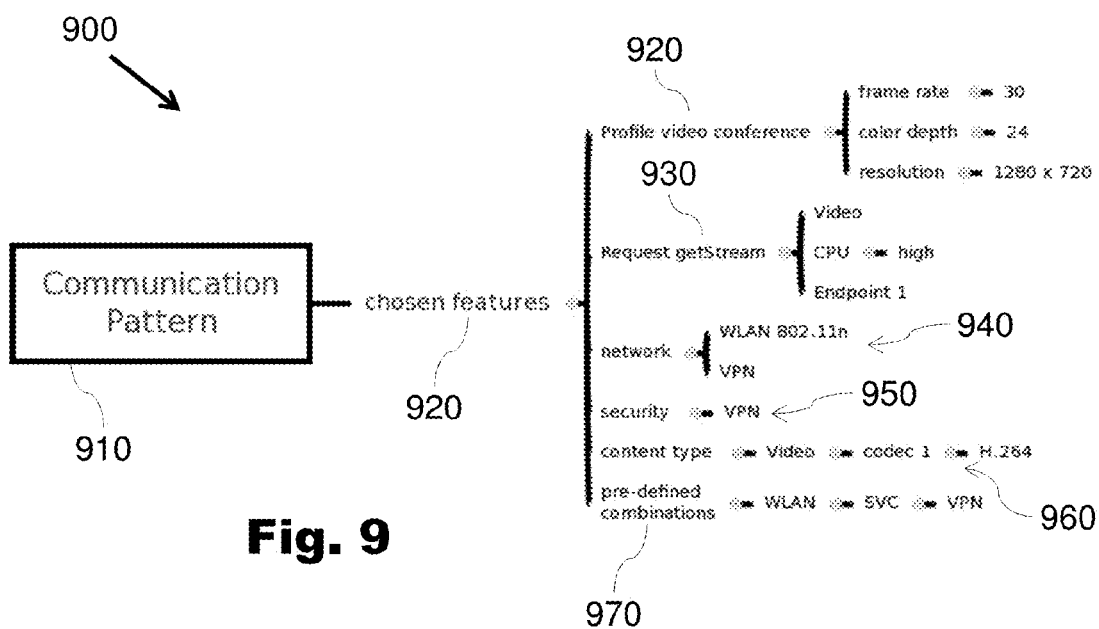
FIG. 9 is a schematic diagram of data structures of device documents, a requirement set, of network configurations or of a selected partial set of DPIDs that are used according to the present invention.

Finally, the decision manager will recommend a suitable subset or partial set of the available options. FIG. 9 shows a data structure 900 having a possible description of the selected communication pattern subset 910, which includes chosen features 920 such as features related to a profile video conference 920, features related to Request getStream 930, features related to network options 940, features related to security options 950, features related to content type 960, and features relates to pre-defined combinations 970. The decision manager has selected the profile "video conference". When the application executes "request getStream", it will receive a video stream from the server with "endpoint 1". The participating networks and protocols are: WLAN, VPN, and the compression standard is SVC (expansion annex G from H.264/MPEG-4 AVC).

The description in FIG. 9 shows an example of how the result of a decision process may look. This result is then converted into a document that describes required adaption components, networks, protocols, their configurations, chronological sequences of calls, etc.

Splitting of the video data stream in the functional unit (decision manager 136, TAL 180, possibly CAL 160) as well as the combination and synchronization in the receiver (terminal 110) will be described in detail below based on a sequence diagram shown in several successive parts in FIGS. 10A to 10C.

Figure 10B:
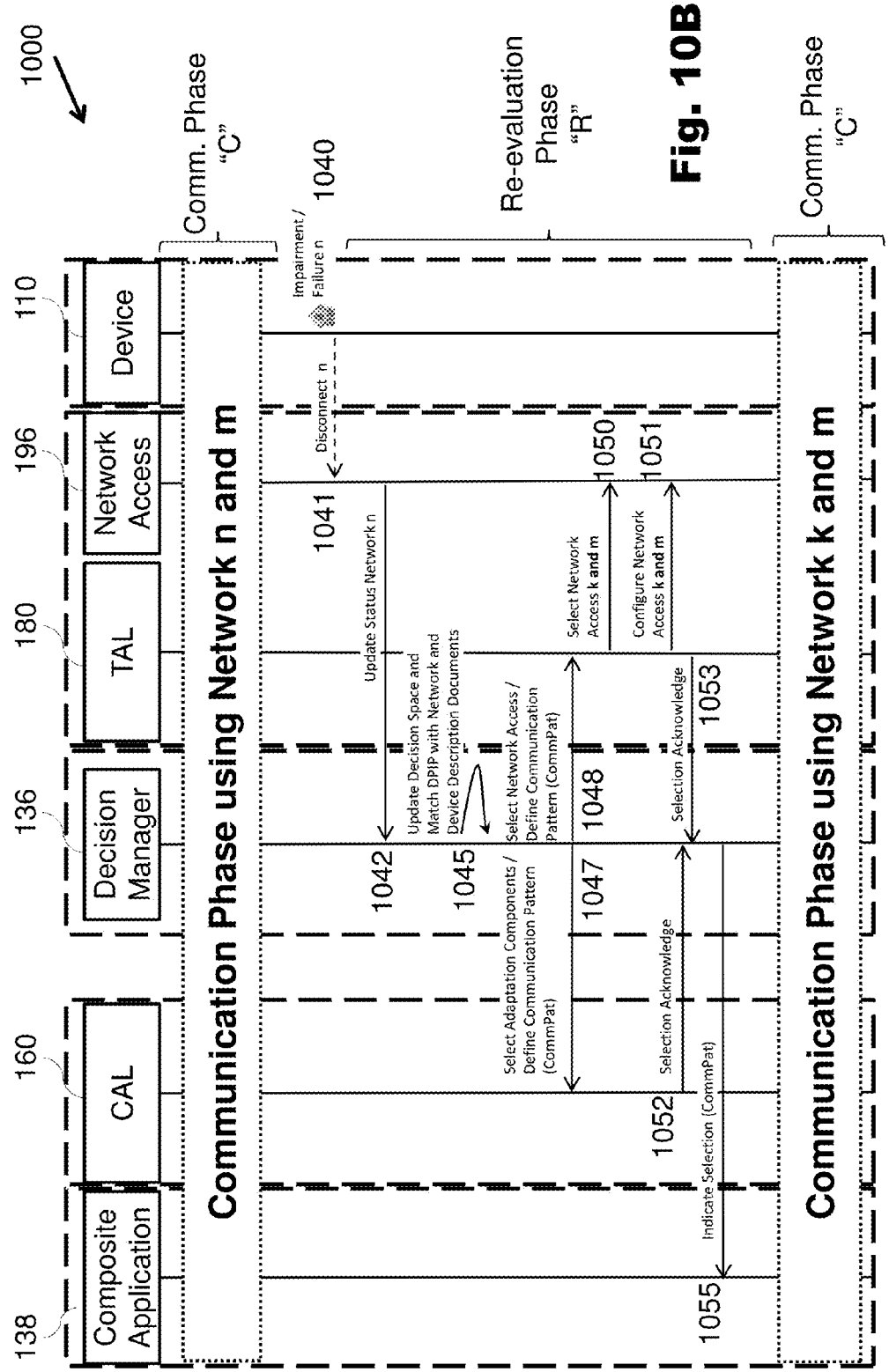

FIGS. 10A to 10C show a process 1000 according to the invention according to an embodiment based on a sequence diagram in three successive sections. In other words, the section of the process 1000 shown in FIG. 10A is followed by the section shown in FIG. 10B, and the section shown in FIG. 10B is followed by the section shown in FIG. 10C. The processing sequence is always from top to bottom.

The previously mentioned components of the NTL architecture and their partial layers are presented as entities or instances. It is assumed that three network access points n, m, k are available. As shown in FIG. 1, the network connections (e.g. connection to Ethernet 122 or radio network 124) terminate at the intersections (e.g. network card 112, connection point 114, etc.).

Process 1000 starts with a selection phase "S". Initially, the device 110 connects with the connectivity layer (network access 196 (steps 1001, 1002, 1003). The connectivity layer corresponds to the multiple network access of the Sillberg architecture presented in FIG. 2. "Network access" stands for multiple network access (see FIG. 2, reference sign 284). It passes this information on to the decision manager 136 (steps 1006, 1007, 1008) together with information about the available network access points n, m, k. The terminal 110 itself transmits a description of its own capabilities, requirements and parameters directly to the decision manager 136 (step 1009). After the start of the application (step 1010) and transfer of its requirements (step 1011), they are passed on from the CAL 160 to the decision manager 136 (step 1012). The latter compares the requirements of the application with those of the network access points (step 1015) and selects from among them a few usable communication patterns and transmits them to both cooperating NTL sublayers CAL 160 and TAL 180 (steps 1017, 1018). Functionally, TAL 180 in FIGS. 10A to 100 refers in particular to the adaptive network functionality 282 as part of TAL 180 according to FIG. 2. As an example, TAL 180 selects now the network access points n and m (step 1020) and configures them (step 1021). After confirming the selection (steps 1022, 1023), the application 138 receives the used or selected communication pattern (step 1025).

The communication phase "C" begins thereafter, and the application 138 begins with the transmission of the usage information (step 1030). The connectivity layer 196 distributes this information appropriately over the network access points n and m (steps 1035, 1036). Since both network access points n and m are available, the application data can be transmitted for example distributed over a base layer and one or more enhanced layers in the present example of a video streaming application and therefore can be transmitted at an improved video quality. The communication phase C using network access n and m) can thus be a communication phase with an increased video quality, cf. starting now at FIG. 10B. A different usage division can be assigned to the two network access points in other applications.

During the communication phase C, the connectivity layer 196 updates the network status repeatedly and transmits it to the decision manager 136 (not shown in detail). The terminal 110 detects an interference or quality deficiency of the network interface n via interface monitoring (step 1040). This triggers a re-evaluation phase "R", which starts with the terminal 110 turning off the network interface n (step 1041). The connectivity layer 196 transmits thereupon an update of the network status to the decision manager 136 (step 1042). The latter evaluates the current situation (step 1045) and now transmits possible communication patterns to the cooperating NTL sublayers CAL 160 and TAL 180 (steps 1047, 1048). TAL 180 selects now the network access points k and m (step 1050) and configures them (step 1051). After confirming the selection (steps 1052, 1053), the application 138 receives the used communication pattern (step 1055) and a communication phase "C" begins again. Although not shown in detail in the Figure, it initially includes a transmission of the usage information to the connectivity layer 196, whereupon this information is appropriately distributed via network access points k and m. Since only the network access points k and m are still available, application data can continue to be distributed via two network access points to terminal 110 and can be recombined there. Because network access point k has previously been rejected in favor of network access point n (selection step 1020), it can now be that only a low video quality is transmitted via network access points k and m or that a lower system stability can be provided or that other features of the data transmission have a lower quality than with a transmission via access points m and n.

After a while, as now shown starting in FIG. 10C, the network access n is stable again (step 1070) and the device (terminal) 1071 connects in a now triggered re-evaluation phase "R" again via this interface (step 1071). It again communicates the connectivity layer 196 to the decision manager 136 (step 1072). The latter evaluates the current situation (step 1075), reestablishes the original utilization of the connectivity via network access points n and m based on its awareness (steps 1077 to 1083 and 1085, which in contents correspond to steps 1017 to 1023 and 1025, such that a renewed explanation can be omitted at this point). The continued progression of the method corresponds again to the communication phase "C" using the networks n and m, which have already been described above, such that a renewed explanation can also be omitted at this point). Process 1000 ends with the end of application 138 (step 1099).

It has already been mentioned that the invention is not restricted to the network types Ethernet and WLAN.

It is further understood that the application 138, which according to the presentation in FIG. 1 is anchored in server 130 and according to FIGS. 10A to 10C executes the process or the processing steps on the server side, can also be distributed to the server 130 and the terminal 110 or implemented only in terminal 110. In this regard, parts of the SVC streaming application 138 of server 130 can also be implemented in the playback application 117 of terminal 110.

The present application is not limited to video streaming applications. All applications, where data are transmitted and adapted via one or more networks, can be considered an application in terms of the present application. Embodiments of the present invention can be particularly suited for video conferencing applications.

By using more than one network access at the same time, e.g. fixed and WLAN network, fixed and cellular (high performance digital signal processing (HDSP), Universal Mobile Telecommunications System (UMTS), Long Term Evolution (LTE), etc.), or WLAN and cellular, the functional unit according to this invention also has the flexibility to route or reroute the different layers of the scalable video codec via different network access points according to the current network conditions and guidelines in order to handle the traffic. As a result, the functional unit is aware of the minimum requirements for the transmission of the different SVC layers as well as the transport guidelines used and matches them to the actual network conditions in accordance with the spectral measurements in the band for available wireless network access points. Based on this match it also determines how many (dependent) layers are transmitted to the endpoint and if additional mechanisms for error correction are required.

The functional unit is informed immediately about changes in the actual network conditions and examines its decisions accordingly. As a result, the loss, recovery or instability of a network access point assumes priority over network quality indications. Depending on the concrete network configuration, the functional unit—as disclosed in this application—can preferably be employed on a media server, a video conferencing server or, if different (administrative) network domains are covered, a "traversal using relays around NAT"-(TURN) server, a "session border controller" (SBC), a combined access router/application layer gateway (ALG) or a "media aware network element" (MANE). On the other hand, with the growing processing power of (mobile) devices, e.g., through multi-core technologies, the functional unit can also be integrated in the device, which uses the technology for interactive video or video upload of a previously recorded video as disclosed in this application. Since the functional unit that is inherent in the network elements, as mentioned above, can include an overview of the actual overall traffic situation, it can also take into account load balancing in order to provide appropriate utilization of network resources across the connection devices.

The method described above allows for dynamic switching of CODECS, speech to text (STT) or text to speech (TTS) (text instead of speech in case of a miserable connection), call admission control (static), mobility proxies (compressing HyperText Markup Language (HTML) pages), SKYPE (establishes multiple TCP connections) depending on the loaded application.

Switching of codecs is concentrated primarily on switching between comparable codec classes such as video codecs. The NTL goes beyond this class limitation by not only switching to comparable codec classes but also to other codecs by using context adaption in a broader sense. For example, shifting from video codecs to audio only codecs to text transmission can occur and then be entered into a TTS processor. Furthermore, the application can influence the adaption options with regard to their capabilities and with regard to application-specific priorities for contents adaption including modality conversion techniques. The content quality can not only be reduced but also raised if better connection options become available.

At the network level, the network-tolerant layer allows an adaption of the communication with regard to application requirements and network capabilities without an explicit connection selection by the application, which enables the decision manager to select the most suitable but not necessarily best connection from among available connections. To influence the decision making process, policies from users or companies can be introduced and allow even an adaption with regard to concerns of pricing or cost structuring, load balancing, traffic relief, which are known only at the infrastructure level but not at the level of the individual user terminal. Such policies can be available as a policy document 420 in FIG. 4, input quantities or documents (DPID) for the layer architecture 200. Furthermore, the superimposition allows for a transfer between different connection technologies (even those that by themselves do not support a transfer) in the NTL 150, without influencing the application.

The features of the invention described with respect to the shown embodiments can also exist in other embodiments of the invention, except when stated otherwise or when impossible for technical reasons. While certain exemplary embodiments of a communication apparatus, communication system, and methods of making and using the same have been shown and described above, it is to be distinctly understood that the invention is not limited thereto but may be otherwise variously embodied and practiced within the scope of the following claims.

What is claimed is:

1. A communication system comprising:
a server computer device having non-transitory memory connected to at least one processor, the server computer device being connectable to at least one terminal device;
the server computer device being configured to distribute data from the server computer device to the terminal device via a content aware layer and transport aware layer of a network transport layer,
the transport aware layer being configured to obtain information regarding network connectivity between the terminal device and the server computer device;
the content aware layer being configured to determine requirements of the terminal device requesting the data from the server computer device;
wherein the transport layer is configured to provide network description information to a decision manager of the server computer device for networks about which at least one communication link to the terminal device is formable to transport the data from the server computer device to the terminal device;
wherein the content aware layer is configured to determine requirements for the data of an application running on the terminal device requesting the data;
the decision manager being configured to match requirements of the application with network connectivity information of the network description information to select at least one first network about which to transmit the data to the terminal device;
wherein the transport aware layer is configured to select at least one access point of the at least one first network selected by the decision manager for the transport of the data from the server computer device to the terminal device about at least one first communication link to be established between the server computer device and the terminal device via the selected at least one first network;
wherein the transport aware layer is configured to detect a failure in the selected at least one first network about which the data is being transported from the server computer device to the terminal device;
the decision manager is configured to select at least one second network about which the data is to be transported from the server computer device to the terminal device in response to the detected failure of the selected at least one first network; and
the transport aware layer is configured to select at least one access point of the selected at least one second network for establishment of at least one second communication link about which the data is to be transmitted from the server computer device to the terminal device in response to the selection of the at least one second network by the decision manager.

2. The communication system of claim 1, wherein the data is encoded for transport in a first quality level for transport via the at least one first network and is encoded for transport in a second quality level for transport via the at least one second network, the second quality level being lower than the first quality level, the at least one second network comprising multiple networks.

3. The communication system of claim 1, wherein the decision manager is configured to match requirements of the application with network connectivity information of the network description information to select the at least one second network about which to transmit the data to the terminal device in response to the failure of the selected at least one first network.

4. The communication system of claim 3, wherein the transport aware layer is configured to detect a resolution of the failure by the at least one first network;
the decision manager is configured to revoke selection of the at least one second network and select the at least one first network in response to resolution of the failure of the at least one first network; and
the transport aware layer is configured to select at least one access point of the at least one first network for transport of the data from the server computer device to the terminal device via the at least one first network.

5. The communication system of claim 4, wherein the decision manager is configured to match requirements of the application with network connectivity information of the network description information to select the at least one first network about which to transmit the data to the terminal device in response to the resolution of the failure of the at least one first network.

6. The communication system of claim 1, wherein the transport aware layer is configured to detect a resolution of the failure by the at least one first network;
the decision manager is configured to revoke selection of the at least one second network and select the at least one first network in response to the resolution of the failure of the at least one first network; and
the transport aware layer is configured to select at least one access point of the at least one first network for transport of the data from the server computer device to the terminal device via the at least one first network.

7. The communication system of claim 6, wherein the data is comprised of at least one of audio data and video data.

8. The communication system of claim 7, wherein the data is encoded for transport in a first quality level for transport via the at least one first network and is encoded for transport in a second quality level for transport via the at least one second network, the second quality level being lower than the first quality level, the at least one second network comprising multiple networks.

9. A communication apparatus comprising:
a computer device having non-transitory memory connected to at least one processor, the computer device being configured to distribute data from the computer device to a terminal device;
the computer device having:
a first functional layer of a network tolerant layer that is integrated between a software application layer and a network access layer to receive first input documents containing application-related information; and
a second functional layer of the network tolerant layer to receive second input documents containing transport-related information;
the computer device configured to identify a plurality of suitable communication patterns involving multiple communication networks based on the first and second input documents, determine currently available transport options and their service quality across at least two communication networks and select a communication pattern from a plurality of suitable communication patterns based on network transmission quality of the at least two communication networks; and the computer device configured to select at least one access point and configure the at least one access point for a first communication phase for transmission of data based on the selected communication pattern via the second functional layer.

10. The communication apparatus of claim 9, wherein:

the first functional layer is configured to identify and separate different layers and descriptions by examination of an encoded data stream; and the second functional layer is configured to dynamically adapt a number of transmitted layers based on available network access points and total available bandwidth.

11. The communication apparatus of claim 9, wherein:

the computer device is configured to:

assign a generic application program interface (API) to the first functional layer, and transport capability options and requirements regarding transport capability via a set of adaptive binding artifacts to the first functional layer, and assign multiple network accesses to the second functional layer; and wherein the second functional layer is configured to communicate current transport capabilities via existing network access points of the multiple networks to which the second functional layer is assigned when a connection is established or altered.

12. The communication apparatus of claim 11 wherein:

the second functional layer is configured to generate a set of transport network capabilities documents based on available network connectivity and measured quality of service for at least one network.

13. The communication apparatus of claim 9, wherein the computer device is configured to:

split a data stream via the first and second functional layers such that the split data stream is combinable and synchronizable at the terminal device to which that split data stream is sent.

14. The communication apparatus of claim 13, wherein the data stream is a video data stream.

15. The communication apparatus of claim 9, wherein the computer device is configured to:

detect a change in the communication pattern that exceeds a threshold;

reevaluate the selected communication pattern in response to the detected change;

receive results of the reevaluating of the selected communication pattern by the first functional layer and the second functional layer, and wherein the second functional layer is configured to select at least one access point and configure the selected at least one access point based on the results of the reevaluation for a second communication phase for transmission of data.

16. The communication apparatus of claim 15, wherein the computer device is configured to:

confirm selection of the at least one access point based on the results of the reevaluation; and transmit usage information for distribution to the at least one access point the second functional layer selected based on the results of the reevaluation.

17. A communication system comprising:

a server computer device having non-transitory memory connected to at least one processor, the server computer device being connectable to at least one terminal device;

the server computer device being configured to distribute data from the server computer device to the terminal device via a content aware layer and transport aware layer of a network transport layer, the transport aware layer being configured to obtain information regarding network connectivity between the terminal device and the server computer device;

the content aware layer being configured to determine requirements of the terminal device requesting the data from the server computer device; and wherein:

the content aware layer is configured to facilitate generation of at least one first input document containing application-related information; and the transport aware layer is configured to facilitate generation of at least one second input document containing transport-related information; and the server computer device is configured to identify a plurality of suitable communication patterns involving multiple communication networks based on the first and second input documents, determine currently available transport options and their service quality across at least two communication networks and select a communication pattern from a plurality of suitable communication patterns based on network transmission quality of the at least two communication networks; and the server computer device is configured to select at least one access point and configure the at least one access point for a first communication phase for transmission of data based on the selected communication pattern via the transport aware layer.

18. The communication system of claim 17, comprising the at least one terminal device and the at least one access point, the server computer device being communicatively connected to the at least one terminal device and the at least one access point.

19. The communication system of claim 17, wherein the server computer device is configured to:

detect a change in the communication pattern that exceeds a threshold;

reevaluate the selected communication pattern in response to the detected change; and select at least one access point and configure the selected at least one access point based on the results of the reevaluation for a second communication phase for transmission of data.

* * * * *